UNITED STATES PATENT OFFICE.

VICTOR HENRI JOSEPH HERENG, OF IXELLES-BRUSSELS, BELGIUM.

PROCESS FOR THE MANUFACTURE OF ARTIFICIAL LITHOGRAPHIC STONES.

1,172,796.  Specification of Letters Patent.  Patented Feb. 22, 1916.

No Drawing.  Application filed May 27, 1913.  Serial No. 770,225.

*To all whom it may concern:*

Be it known that I, VICTOR HENRI JOSEPH HERENG, a subject of the King of Belgium, residing at 82 Rue Sans-Souci, Ixelles-Brussels, in the Kingdom of Belgium, have invented certain new and useful Improvements in Processes for the Manufacture of Artificial Lithographic Stones, of which the following is a specification.

This invention relates to the manufacture of artificial lithographic stones.

It has for object a process which will allow of obtaining compact stones with homogeneous and very fine grain, which are not porous, and which will not crack from exposure to the air and are particularly resistant to atmospheric influences.

To this end the invention consists essentially in impregnating with water the mixture of materials entering into the compositions of the artificial lithographic stone, while it is being subjected to a high degree of pressure so as to effect, by the increase of volume of the molecules of the materials under the action of the water, the complete expulsion of the air contained in the mass.

The mixture used for the manufacture is composed essentially of cement, white stone (*pierre d'Euville*) trass, and white sand, and this mixture, treated according to the process forming the subject of the invention is kept for a long time in water in order to obtain a particularly slow setting contributing to the obtaining of a particularly homogeneous and resistant product. The drying is afterward effected also in a slow and uniform manner in order to preserve all the qualities of the stone.

In carrying out the invention I preferably proceed in the following manner. I mix 3 parts by weight of cement, 1 part of finely ground white stone, 1 part of trass and 1 part of white sand. This mixture is afterward suitably screened and bolted so as to eliminate lumps or impurities. The mixture is afterward placed in molds, the sides of which are provided with small holes, and rammed as the filling of the mold proceeds. The mold being thus filled with dry material representing for example a thickness of 12 centimeters, the mixture is compressed in the dry state so as to reduce the thickness of the material contained in the mold to about 10 centimeters. The mold is then placed in a vessel serving to contain water, and the contents of the mold are subjected to a degree of high pressure (130 to 140 tons per square meter for example) developed by means of a hydraulic press. Water is afterward admitted into the vessel to a suitable depth as for example about 1.5 m. and the high pressure to which the mixture is subjected is maintained. Under these conditions the water which penetrates into the mold through the small holes made in the sides gradually impregnates the mixture and causes the molecules of cement to swell. As the mass cannot increase in volume by reason of the pressure to which it is subjected the air contained in the mass is completely driven out of the mold. The pressure is maintained until it is found that the bubbles of air no longer rise to the surface of the water contained in the vessel. This result is generally attained after a period of about 24 hours under pressure in the water. The air being then completely expelled from the mass, the latter commences to set and is free from pores. The water is then allowed to flow out of the vessel and the stone is withdrawn from the mold after having been further maintained under pressure during a certain time (3 hours for example). After being submitted to the action of the air for a short time (48 hours at the most) it is placed in water and is allowed to remain therein for a long time, for example, for about 1 to 3 months so as to retard the hardening of the stone and to insure that this hardening shall take place at first in the central part of the mass and gradually extends toward the outer surface. After this prolonged stay in the water the stone is left to dry slowly in a damp place and at a regular temperature where it is protected from the action of currents of air. After being left from 2 to 4 months to dry the stone can be pumiced and used in the same manner as a natural stone. The stone thus obtained is free from pores, unctuous to the touch, does not absorb moisture and is not affected by the atmosphere. This result is principally due to the wetting under pressure of the mixture serving for the formation of the stone, this mode of working presenting as already stated, the advantage of insuring in a certain manner the expulsion of the air, the presence of which is the usual cause of porosity in most artificial stones which have heretofore been produced. Moreover, owing to the particular mixture employed for the manufacture, the stone has a clear tint and is particularly smooth and soft to the touch. These properties are obtained in a particularly favorable manner when cements of different manufacture or origin possessing for example, different qualities, are used in the composition of the mixtures; in this case in fact the advantageous properties of one quality of cement tend to compensate for the defects of the other qualities employed conjointly in the mixture and vice versa, and a final mixture is obtained, the properties of which are particularly uniform and regular. The addition of white stone to the mixture of the cements (for example of 3 parts of cements of different origins) increases the resistance of the stone formed, while the trass regulates and augments the cohesion and the white sand renders the final product less sensitive to outer influences while increasing the whiteness of the stone.

What I claim is:

1. A process for the manufacture of artificial lithographic stone, said process consisting in mixing cement, trass, white stone and sand, then compressing the mixture in the dry state in a suitable mold, then impregnating the mixture with water while subjecting it to a high pressure and finally drying slowly the compressed mixture.

2. A process for the manufacture of artificial lithographic stone, said process consisting in mixing cement, trass, white stone and sand, then compressing the mixture in the dry state in a suitable mold, then impregnating the mixture with water when it is in a compressed state, then allowing the stone thus obtained to remain in water for a very long time, and finally drying the stone slowly.

3. A process for the manufacture of artificial lithographic stone, said process consisting in mixing cement, trass, white stone and sand, then compressing the mixture in the dry state in a suitable mold, then impregnating said mixture with water while subjecting it to the action of a high pressure, whereby the water is caused to penetrate into the mold, then maintaining said pressure until bubbles of air no longer rise to the surface of the water, then withdrawing the stone formed by the compression of the mixture from the mold, then maintaining the stone for a long time in the water, whereby the hardening of the stone is retarded, and finally drying the stone slowly at a regular temperature.

4. A process for the manufacture of artificial lithographic stone, said process consisting in mixing cement, finely ground white stone, trass and white sand, then screening and bolting said mixture, placing said mixture in a suitably perforated mold, ramming the mixture as the filling of the mold proceeds, then compressing the mixture in the dry state then placing the mold with the mixture contained therein in a vessel adapted to contain water, afterward subjecting the mixture to the action of water while it is compressed under a high pressure, whereby the air contained in the mass is completely expelled, then withdrawing the stone thus obtained from the mold, then maintaining the stone in water for a period of about 2 to 4 months and finally drying the stone in a damp place while being protected from currents of air, said drying operation being effected during about four months.

5. The process for the manufacture of artificial lithographic stone, said process consisting in forming said stone with a mixture of three parts of cement, one part of finely ground white stone, one part of trass and one part of white sand, then suitably compressing and impregnating said mixture and finally drying slowly the stone formed by the compression of the mixture.

In testimony whereof I have affixed my signature in presence of two witnesses.

VICTOR HENRI JOSEPH HERENG.

Witnesses:
 JACQUE BEDE,
 G. DEMARET.

Copies of this patent may be obtained for five cents each, by addressing the "Commissioner of Patents, Washington, D. C."